(12) United States Patent
Kilambi et al.

(10) Patent No.: US 9,491,037 B2
(45) Date of Patent: Nov. 8, 2016

(54) ENHANCED EXPORTER TOOL

(75) Inventors: Pradeep Kilambi, Raleigh, NC (US); Maureen E. Duffy, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1794 days.

(21) Appl. No.: 12/191,870

(22) Filed: Aug. 14, 2008

(65) Prior Publication Data
US 2010/0042939 A1 Feb. 18, 2010

(51) Int. Cl.
| | | |
|---|---|---|
| G06F 15/16 | (2006.01) | |
| H04L 12/24 | (2006.01) | |
| G06F 9/445 | (2006.01) | |
| G06F 3/0482 | (2013.01) | |
| H04L 29/06 | (2006.01) | |
| H04L 12/771 | (2013.01) | |
| H04L 12/26 | (2006.01) | |

(52) U.S. Cl.
CPC ............ *H04L 41/00* (2013.01); *G06F 3/0482* (2013.01); *G06F 8/60* (2013.01); *H04L 12/24* (2013.01); *H04L 29/06557* (2013.01); *H04L 41/22* (2013.01); *H04L 43/14* (2013.01); *H04L 45/563* (2013.01); *H04L 63/02* (2013.01)

(58) Field of Classification Search
CPC ................. H04L 43/14; H04L 45/563; H04L 29/06557; H04L 29/00864; H04L 63/0209; H04L 63/02; H04L 12/2689; G06F 8/60
USPC ........................................................ 709/219
See application file for complete search history.

(56) References Cited

U.S. PATENT DOCUMENTS

| | | | | |
|---|---|---|---|---|
| 2002/0129129 | A1* | 9/2002 | Bloch et al. ................. | 709/220 |
| 2007/0250595 | A1* | 10/2007 | Landfield ..................... | 709/218 |
| 2007/0271552 | A1* | 11/2007 | Pulley ...................... | G06F 8/60 |
| | | | | 717/120 |
| 2008/0028008 | A1* | 1/2008 | Brunet et al. ................ | 707/204 |
| 2008/0301670 | A1* | 12/2008 | Gouge et al. ................ | 717/173 |
| 2009/0055817 | A1* | 2/2009 | Maj .............................. | 717/173 |
| 2009/0187899 | A1* | 7/2009 | Mani et al. .................. | 717/168 |
| 2010/0138392 | A1* | 6/2010 | Carroll et al. ............... | 707/652 |
| 2010/0223576 | A1* | 9/2010 | Serra et al. .................. | 715/781 |
| 2010/0287544 | A1* | 11/2010 | Bradfield et al. ............ | 717/172 |

OTHER PUBLICATIONS

Tammy Fox, Red Hat Enterprise Linux 5 Administration, Apr. 2007, Sams Publishing, Whole book ISBN-10:0-672-32892-5, ISBN-13: 978-0-6723-2892-3.*
Kilambi, P., "Populate Content on a Disconnected PHN Satellite," Mar. 2008.
Kilambi, P., "How to populate content on a disconnected Red Hat Network Satellite server,"Red Hat Magazine online, Apr. 3, 2008.

* cited by examiner

*Primary Examiner* — Tom Y Chang
(74) *Attorney, Agent, or Firm* — Lowenstein Sandler LLP

(57) ABSTRACT

Some embodiments of an enhanced exporter tool have been presented. In one embodiment, a connected centralized server is synchronized with an external server of a software vendor over an external network. The connected centralized server may reside in an internal network of a customer of the software vendor. Content from the connected centralized server is exported to a disconnected centralized server of the customer according to a set of criteria. The disconnected centralized server may reside in a secured portion of the internal network of the customer.

24 Claims, 18 Drawing Sheets

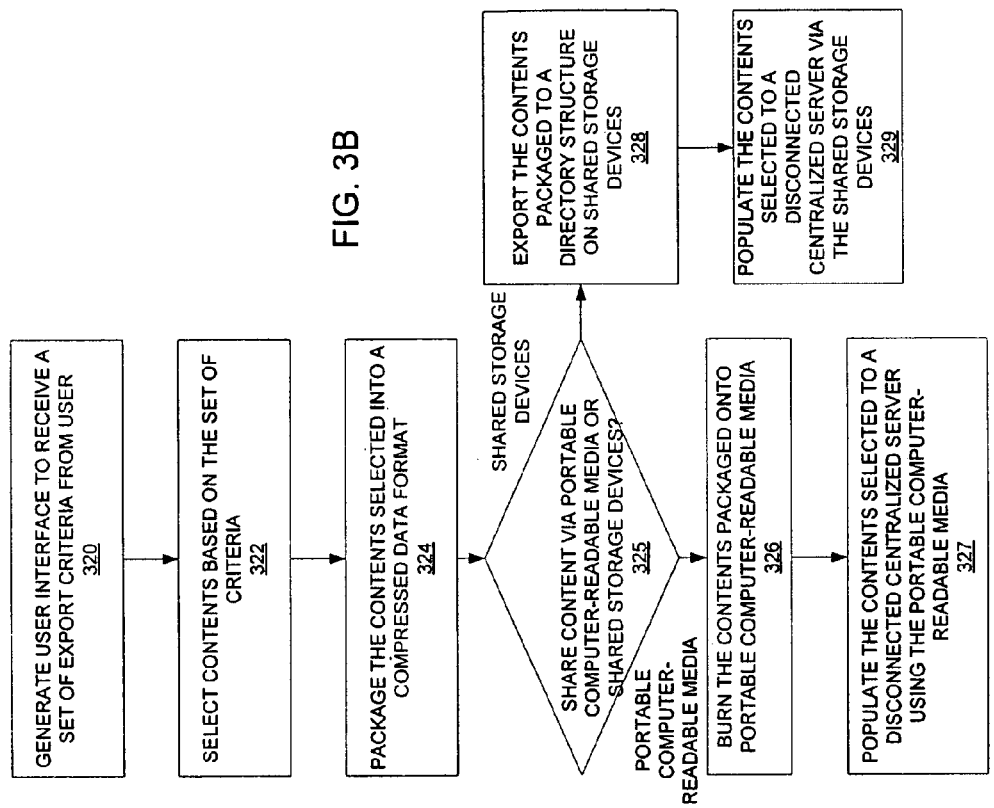
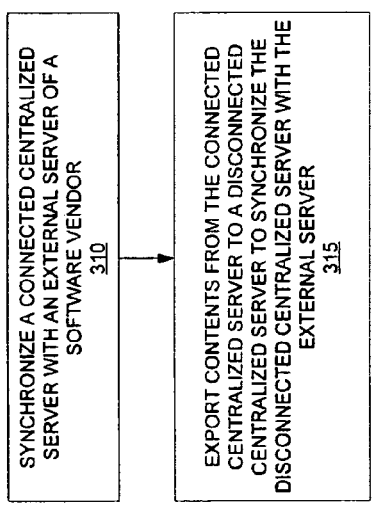
FIG. 3B
FIG. 3A

Select Software Channels for Export

The following is a list of software channels in the Red Hat Marketing organization on your Satellite located at http://satellite.rhndev.redhat.com/. Please select the software channels from which you would like to export content below:

Parent Software Channels:

- ☐ Select All Parent Channels
- ☑ Red Hat Enterprise Linux AS (v. 4 for 64-bit)
- ☐ Red Hat Enterprise Linux AS (v. 3 for 32-bit)
- ☐ Red Hat Enterprise Linux AS (v. 3 for 64-bit)
- ☐ Red Hat Enterprise Linux AS (v. 2.1 for 32-b...
- ☐ Red Hat Enterprise Linux AS (v. 2.1 for 64-b...
- ☐ Red Hat Enterprise Linux AS (v. 2.1 for 64-b...

Child Software Channels:

- ☑ Select All Child Channels
- ☐ Red Hat Network Tools for RHEL AS (v. 4 for x...
- ☑ Red Hat Network Proxy (v. 3.7 for AS v4 x86)
- ☑ Red Hat Network Proxy (v. 4.0 for AS v4 x86)
- ☑ Red Hat Network Proxy (v. 4.1 for AS v4 x86)
- ☑ Red Hat Network Proxy (v. 4.2 for AS v4 x86)
- ☑ RHEL AS (v. 4 for x86) Hardware Certification ✗ Cancel    ◁ Back    ▶ Forward

FIG. 4B

Select Content Types for Inclusion — 430

The following is a list of the potential types of content you may include or exclude from your channels you've selected for content export. Please select the types of content you'd like to include below:

Content Types: — 432

- ☑ Software Packages (RPMs)
  RPM files for software in the channel.
- ☑ Software Package Metadata
  Manages package dependencies for installation/removal.
- ☑ Software Errata
  Security, bug fix, and enhancement updates for software.
- ☑ Kickstart Profiles
  Used to provision new systems with channel content.

✗ Cancel     Back     ▶ Forward

FIG. 4C

Choose Export Type

There are two types of content exports you can create from your Satellite. Depending on your needs, you will need select one or the other. Please review the information provided and make your selection below:

⊞ Base Satellite Content Export
This will result in the inclusion of all available content of the selected types in the selected channels (10 channels selected).

⊞ Incremental Satellite Content Export
This will only include content that was added to the channel between the dates specified below:

Start Date:
Month: May ▼   Day: 17 ▼   Year: 2007

End Date:
Month: July ▼   Day: 23 ▼   Year: 2007

✖ Cancel          ▲ Back          ▲ Forward

FIG. 4D

ENHANCED EXPORTER TOOL

COPYRIGHT NOTICE

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright© 2008 Red Hat, Inc.

TECHNICAL FIELD

Embodiments of the present invention relate to an enhanced exporter tool, and more specifically to using the enhanced exporter tool to synchronize servers.

BACKGROUND

Conventionally, some software vendors allow customers to locally host subscribed contents within the customers' networks. The subscribed contents may be metadata, information on provisioning, entitlements, etc. In one conventional system, a software vendor deploys a server to a customer's internal network to host subscribed contents of the system locally. The server may further manage and maintain software licensed to the customer. Typically, the server has direct connection to the software vendor over an external network. As such, the server may synchronize with the software vendor directly via the direct connection. For example, the server may access contents of the software vendor periodically to check for updates and to download the updates, if available.

However, the direct connection with the software vendor exposes the server to the external network, which may include publicly accessible networks (e.g., the Internet). Because of such exposure, the server may become more susceptible to unauthorized intrusion or hacking.

BRIEF DESCRIPTION OF THE DRAWINGS

The present invention is illustrated by way of example, and not by way of limitation, in the figures of the accompanying drawings and in which:

FIG. 3A illustrates one embodiment of a method to synchronize a disconnected centralized server using a connected centralized server.

FIG. 3B illustrates one embodiment of a method to export content.

FIGS. 4A-4H illustrate some embodiments of a series of graphical user interfaces.

DETAILED DESCRIPTION

Figure 1:
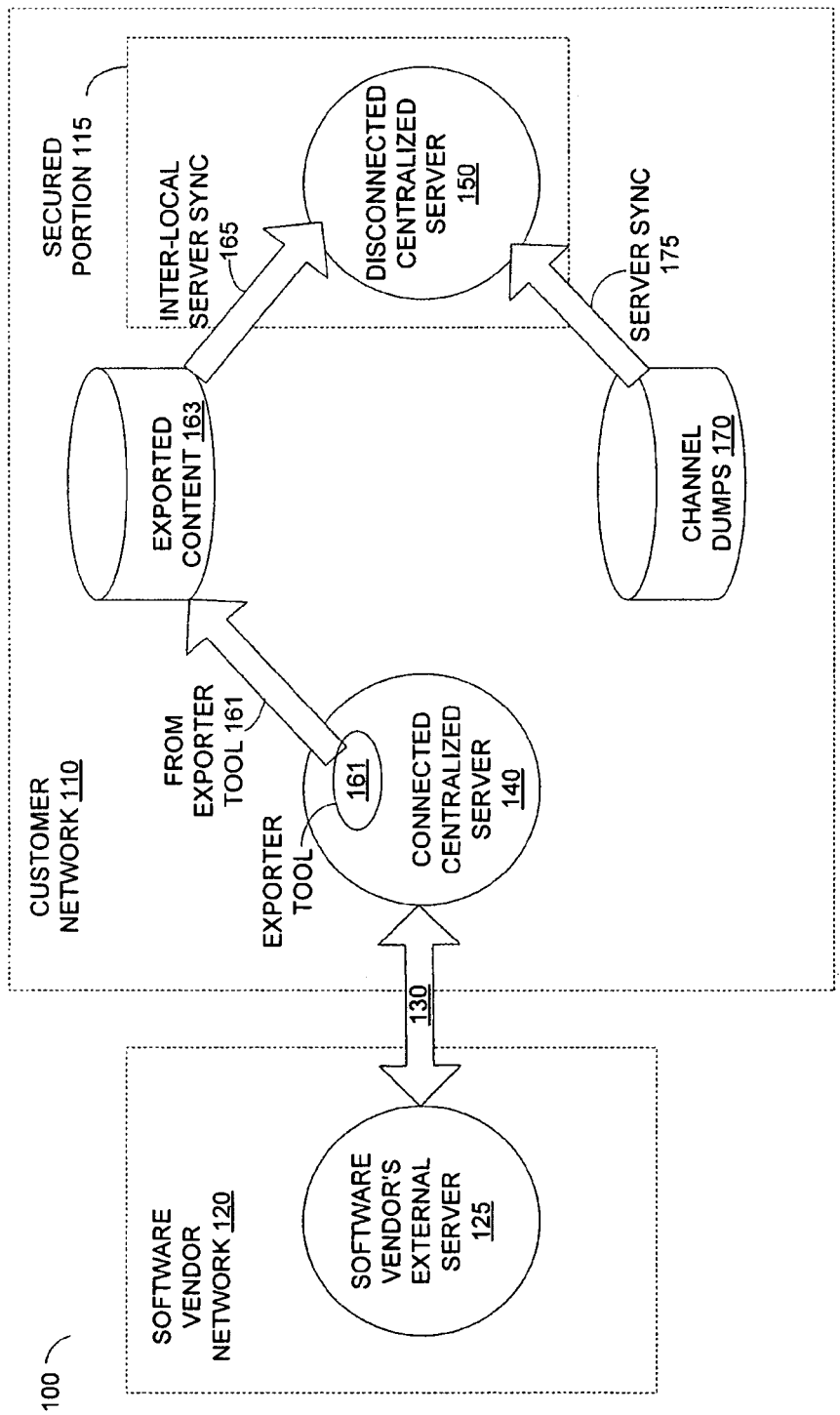
FIG. 1 illustrates one embodiment of a system in which embodiments of the present invention may be implemented.

Described herein are some embodiments of an enhanced exporter tool. In one embodiment, backend enhancements to an exporter tool running locally on a connected centralized server in a customer's internal network are provided to export contents from the connected centralized server, such that additional channels and content types may be exported as well. For example, in one embodiment, channels, packages, errata, provisioning information (e.g., kickstart trees, kickstart files, kickstart profiles), package metadata, activation keys, user definitions, and/or system groups, system configuration data, system software profiles, installable software media, virtual machine images, system metadata, etc., may be exported from the connected centralized server into data files of a predetermined format (e.g., compressed extended markup language (XML) data files). The data files may be packaged into a predetermined compressed data format, such as International Organization of Standards (ISO) images, which may be burnt onto one or more portable computer-readable media. Alternatively, the contents may be exported as multiple files to a directory structure on shared storage devices within the customer's internal network. The contents exported may be selected based on various criteria, such as content type, date range, etc. In some embodiments, a user interface (e.g., a command line interface, a graphical user interface, etc.) is generated to allow users to input these criteria. More details of some embodiments of the enhanced exporter tool are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, compact disks (CDs), digital video disks (DVDs), and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. The system 100 includes a software vendor network 120 and a customer network 110 coupled to each other via a secured connection 130, such as a virtual private network (VPN) over a public network (e.g., the Internet). The software vendor network 120 includes an external server 125 of the software vendor. The customer network 110 may include various networks, such as a local area network (LAN), Ethernet, etc. Connections within and between the networks 120 and 110 may include wirelined and/or wireless connections. The network 110 further includes a first centralized server 140, a second centralized server 150, exported content 163, and channel dumps 170. Note that the first centralized server 140 is communicably coupled to the external server 125 via the secured connection 130, while the second centralized server 150 is not connected to the external server 125. Thus, the first centralized server 140 and the second centralized server 150 are hereinafter referred to as the connected centralized server 140 and the disconnected centralized server 150, respectively.

Through the secured connection 130, the connected centralized server 140 within the customer network 110 may access the external server 125. For example, the external server 125 may host a website of the software vendor and the connected centralized server 140 may establish the secured connection 130 to the website using one or more Internet security protocol (e.g., secure socket layer (SSL), secure shell (SSH), transport layer security (TLS), etc.). Thus, the connected centralized server 140 may securely retrieve or download various contents from the external server 125, such as contents that are available only by purchase and/or license (e.g., metadata of an operating system, such as Red Hat Enterprise Linux provided by Red Hat, Inc. of Raleigh, N.C., information on provisioning (e.g., kickstart profiles, kickstart trees, etc.), executables of client applications, etc.). The contents retrieved are stored locally within the connected centralized server 140. Alternatively, the connected centralized server 140 may store the contents in a local database within the network 110.

In some embodiments, one or more computing machines and network devices (e.g., servers, workstations, personal computers, personal digital assistants, proxies, databases, etc.) may be coupled to the connected centralized server 140 and/or the disconnected centralized server 150 within the customer network 110. The connected centralized server 140 and/or the disconnected centralized server 150 manage these computing machines and network devices (e.g., databases, proxies, etc.). For instance, the connected centralized server 140 and/or the disconnected centralized server 150 may provision virtual hosts and/or virtual guests on the computing machines, configure the computing machines and the network devices, install client applications on the computing machines, etc. However, to avoid obscuring the view, these computing machines and network devices are not shown in FIG. 1.

In some embodiments, the portion of the customer network 110 in which the disconnected centralized server 150 resides is referred to as a secured portion 115 of the customer network 110. Because the disconnected centralized server 150 is not connected to any external server or external network, the disconnected centralized server 150 may be better protected from unauthorized intrusion than the connected centralized server 140. As such, the disconnected centralized server 150 may be used for performing tasks that require a higher level of security, such as mission critical tasks, for the customer while the connected centralized server 140 is used for obtaining updates from the external server 125 for synchronization.

As a customer of the software vendor, the customer may have the centralized servers 140 and 150 synchronized with the external server 125 of the software vendor from time to time to obtain various updated contents from the software vendor, such as new versions of software, errata, new or modified kickstart profiles, system configuration data, system software profiles, installable software media, virtual machine images, system metadata, etc. Because the connected centralized server 140 is connected to the external server 125 via the secured connection 130, the connected centralized server 140 may directly obtain updates from the external server 125 over the secured connection 130 in order to synchronize with the external server 125. Furthermore, the connected centralized server 140 may cache the updated contents from the external server 125 locally.

In some embodiments, the connected centralized server 140 may synchronize with the external server 125 by checking with the external server 125 for updates and/or changes to the contents retrieved previously. Such synchronization may be performed periodically and/or in response to user requests. Alternatively, the connected centralized server 140 could probe the external server 125 to check for any changes and/or updates to the contents previously provided to the connected centralized server 140. When there is a change to the contents previously retrieved, the connected centralized server 140 may retrieve the change from the external server 125 and then update a copy of the contents on the connected centralized server 140 accordingly, or the connected centralized server 140 may simply retrieve an updated version of the contents to replace the previously retrieved version. In some embodiments, synchronization is performed via one or more channels within the secured connection 130 between the connected centralized server 140 and the external server 125. A channel as used herein generally refers to a collection of software packages organized into a logical grouping. For example, the set of packages that make up an operating system is organized into a channel in some embodiments. Different types of contents may be associated with different channels such that the connected centralized server 140 may choose to synchronize only a subset of the channels. For example, information related to provisioning virtual hosts and virtual guests may be associated with a Tool channel, and the connected centralized server 140 may choose to synchronize only the Tool channel at a particular time.

Unlike the connected centralized server 140, the disconnected centralized server 150 has to synchronize with the external server 125 via other mechanisms. In some embodiments, two mechanisms are provided to allow the disconnected centralized server 150 to synchronize with the external server 125. The first mechanism uses an exporter tool 161 running locally on the connected centralized server 140, while the second mechanism uses channel dump to package content into a predetermined compressed data format, such as International Organization of Standardization (ISO) images, from the external server 125. Each mechanism will be discussed further below.

As mentioned above, the first mechanism uses an exporter tool 161 running locally on the connected centralized server 140. Because of its connection to the external server 125, the connected centralized server 140 may download updated content from the external server 125 periodically. In some embodiments, the export tool 161 on the connected centralized server 140 extracts contents based on some predetermined criteria and generates its own channel dumps locally. For example, the criteria may include a particular channel, a range of dates, one or more content types, etc. In some embodiments, the exporter tool 161 queries through a local data repository (also referred to as a database) of the connected centralized server 140 and exports all contents in the particular channel in the local data repository and the file system of the connected centralized server 140. The exporter tool 161 supports various content types, such as channels, channel families, package metadata, RPM Package Managers (RPMs), errata, kickstart profiles, kickstart trees, etc. To further illustrate the use of the exporter tool 161, an example is discussed in detail below.

In one embodiment, an administrator of the customer network 110 may find out what channels are available on the connected centralized server 140 using the following command:
[root@connected~]# rhnsatelliteexporter listchannels db=rhnsat/**@rhnsat In response to the above command, the connected centralized server 140 lists all channels available. In some embodiments, the channels may include base channels (B) and/or child channels (C). Then the connected centralized server 140 may present a list of available channels synchronized with the software vendor's external server 125**, such as the following:
B rhel-i386-server-5
C rhel-i386-server-vt-5
C rhn-tools-rhel-i386-server-5

Suppose the administrator chooses to export all of the above channels in the current example. Then the base channel content for the specified channels may be exported as follows. Each content type may be categorized and dumped using the following commands:
1. To create a directory to dump all the exported contents:
[root@connected~]# mkdir /tmp/dumps 2. To export base channel content:
[root@connected ~]# rhnsatelliteexporter --db=rhnsat/*****@rhnsat dir=/tmp/dumps -c rheli386server5 -c rheli386servervt5 -c rhntoolsrheli386server5 --debug=5
3. To export incremental channel content:
[root@connected~]# rhnsatelliteexporter --db=rhnsat/*****@rhnsat dir=/tmp/dumps/ --startdate=20071206000000 --enddate=20080206000000 -c rheli386server5-c rheli386servervt5 -c rhntoolsrheli386server5 --debug=5

In some embodiments, multiple channels may be exported at substantially the same time using -c or -- channel option. In one embodiment, this option combines all data of the above channels and dumps the data under a predetermined directory. If no end date is specified, then the exporter tool 161 may use the current date as the end date. In one embodiment, the --db option directs the exporter tool 161 to extract the requested content from the local data repository of the connected centralized server 140.

In response to the above commands, the exporter tool 161 gathers all contents of the base channel rhel-i386-server-5 and its child channels and dumps the contents gathered into the specified directory /tmp/dumps/. In some embodiments, contents in the specified directory is further divided into different content types as follows:
[root@connected~]# ls 1 /tmp/dumps/total
drwxrxrx 2 root root 4096 Nov 11 02:30 arches
drwxrxrx 2 root root 4096 Nov 11 02:30 blacklists
drwxrxrx 2 root root 4096 Nov 11 02:30 channel_families
drwxrxrx 3 root root 4096 Nov 11 02:30 channels
drwxrxrx 12 root root 4096 Nov 11 02:47 errata
drwxrxrx 4 root root 4096 Nov 11 02:47 kickstart_files
drwxrxrx 2 root root 4096 Nov 11 02:47 kickstart_trees
drwxrxrx 102 root root 4096 Nov 11 02:44 packages
drwxrxrx 102 root root 4096 Nov 11 02:30 packages_short
drwxrxrx 102 root root 4096 Nov 11 02:31 rpms In some embodiments, the administrator may exclude specific content types from the channel dump using --no-<content> option. This option may be limited to certain content types, such as RPMs, packages, errata, and kickstart trees. For example, the following command may be used to exclude RPMs from the rhel-i386-server-5 dump: [root@connected~]# rhnsatelliteexporter -c rheli386server5 -dir/tmp/dumps -no-rpms Once the requested contents have been exported to the specified directory, /tmp/dumps/, the contents may be made accessible to the disconnected centralized server 150 via a number of ways. In one embodiment, the exported contents may be burnt onto one or more portable computer-readable media (e.g., CD, DVD, etc.), which may be carried to the disconnected centralized server 150. In one embodiment, the exporter tool 161 has the option to package the contents into a compressed data format suitable for burning onto one or more portable computer-readable media (e.g., CD, or DVD, etc.), such as CD or DVD ISO images. This may be achieved using the --make-iso=<cd or dvd> option. Referring back to the above example, the following command may be used to package contents into CD ISO images:
[root@connected~]# rhnsatelliteexporter --db=rhnsat/rhnsat@rhnsat --dir=/tmp/ --startdate=20060106000000 -c rheli386server5 --debug=5 --makeiso=cd Likewise, the following command may be used to package contents into DVD ISO images:
[root@connected~]# rhnsatelliteexporter --db=rhnsat/rhnsat@ rhnsat --dir=/tmp/ --startdate=20060106000000 -c rheli386server5 --debug=5 --makeiso=dvd Further, the following command may be used to create a second directory under the directory previously specified using --dir and dump the ISO images into the directory along with MD5SUM for all the ISO images:

[root@connected~]# ls -ld /tmp/dumps/satellite-isos/*
-rw-r--r--1 root root 63 Nov 15 16:46 /tmp/dumps/Satellite-isos/MD5SUM
-rw-r--r--1 root root 656816128 Nov 15 16:43 /tmp/dumps/Satellite-isos/rhn-export-20071115.0-01.iso Once the CD ISO images have been generated, the CD ISO images may be burnt onto a CD 163 using the following command:

[root@connected~]# cdrecord -v -pad speed=1 dev=0,0,0 /tmp/dumps/satellite-isos/rhn-export-20071115.0-01.iso The above process of generating the channel content may remain substantially the same for any channel and any amount of content. Therefore, in one embodiment, an administrator may setup the connected centralized server 140 to repeat the above process periodically, such as by setting up a cron job.

In some embodiments, the contents on the portable computer-readable media may be populated to the disconnected centralized server 150 as follows. First, a mount point is created to mount the media using the following command:

[root@disconnected~]# mkdir /mnt/dumps

Then the media is mounted to the disk using the following command:

[root@disconnected~]# mount -t iso9660,udf /dev/cdrom /mnt/dumps

The administrator may use the following command to check if the mounted channel dumps have the correct content:

[root@disconnected~]# satellite-sync --mount-point=/mnt/dumps --list-channels

Then the following satellite-sync command may be used to point to the above mount point on disk and synchronize down the channel content from the dumps:

[root@disconnected~]# satellite-sync --mount-point=/mnt/dumps -c rhel-i386-server-5

The time it takes the satellite-sync operation to complete may be based on how much content is being synchronized. Once the satellite-sync operation is completed, the disconnected centralized server 150 is all set with the required updated contents. The above process may be referred to as inter-local server synchronization 165. The inter-local server synchronization 165 may be repeated periodically to keep the disconnected centralized server 150 up-to-date with respect to the external server 125.

In addition to the above mechanism, the connected centralized servers 140 and/or the disconnected centralized servers 150 may synchronize with the external server 125 using a second mechanism, channel dumps, in some embodiments. As mentioned above, the second mechanism uses channel dump content in a compressed data format from the external server 125. For instance, the software vendor may provide channel dump media 170 with a base channel dump per channel, supplemented with an incremental dump for every release update. The content of the channel dump may be delivered to the customer as embodied in the media 170. Some examples of the media 170 include CDs, DVDs, flash memory cards with Universal Serial Bus (USB) connectors, etc.

Figure 2A:
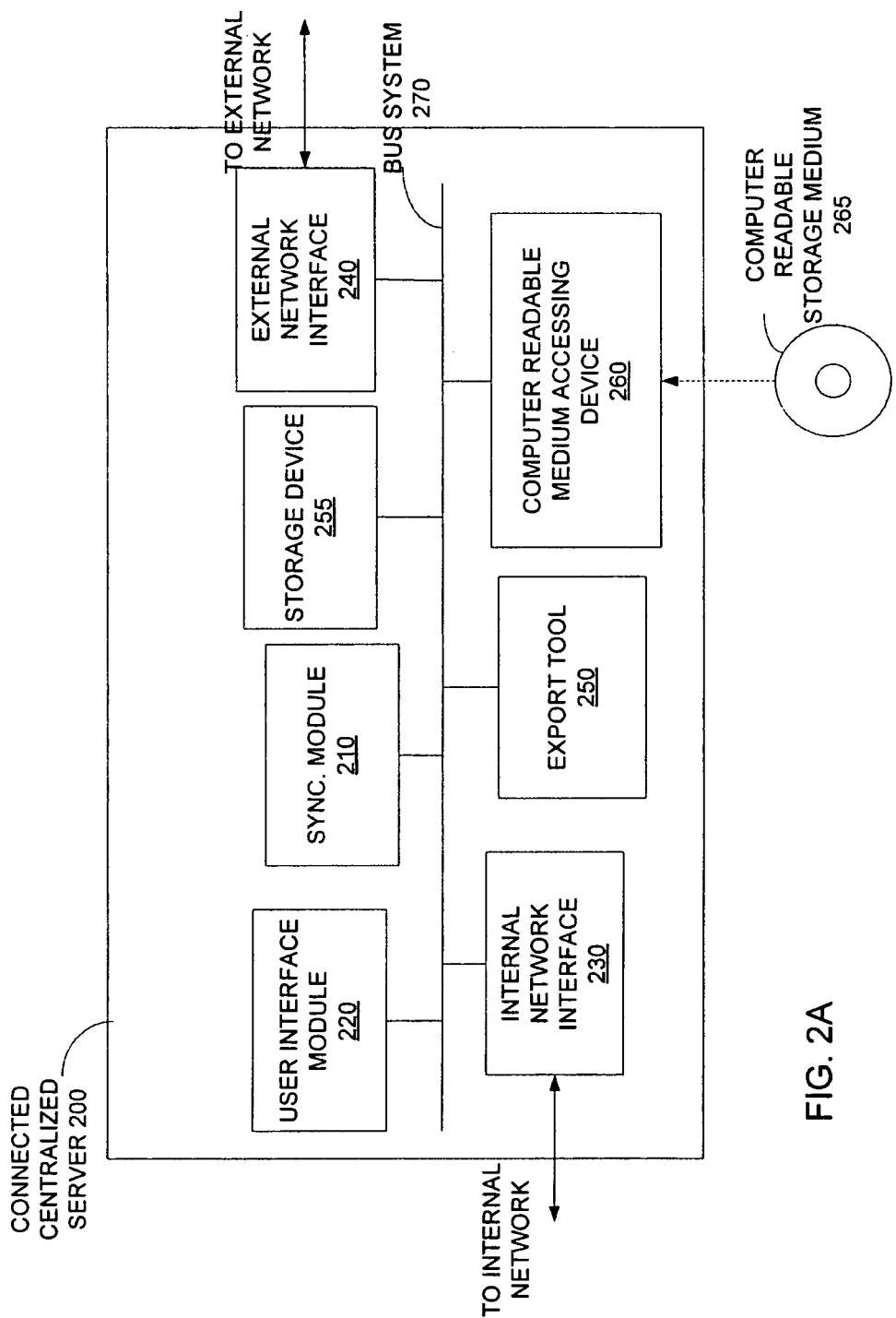
FIG. 2A illustrates a functional block diagram of one embodiment of a connected centralized server.

FIG. 2A illustrates a functional block diagram of one embodiment of a connected centralized server. The connected centralized server 200 may reside in an internal network of a customer of a software vendor, such as the connected centralized server 140 in FIG. 1. The connected centralized server 200 includes a synchronization module 210, a user interface module 220, an internal network interface 230, an external network interface 240, an export tool 250, a storage device 255, and a computer-readable medium accessing device 260, which are coupled to each other via a bus system 270. The computer-readable medium accessing device 260 may be removably coupled to a portable computer-readable medium 265.

In some embodiments, the connected centralized server 200 is communicably coupled to an external server (e.g., the external server 125 in FIG. 1) of the software vendor over an external network via the external network interface 240. For instance, the external network may include the Internet. From time to time, the synchronization module 210 downloads updated contents from the external server via the external network interface 240. The updated contents downloaded may be cached in the storage device 255. The synchronization module 210 then synchronizes the contents on the connected centralized server 200 with the external server using the updated contents downloaded. Details of some embodiments of the synchronization process have been discussed above.

In some embodiments, the connected centralized server 200 is communicably coupled to the internal network of the customer via the internal network interface 230. Via the internal network, the connected centralized server 200 may be further coupled to other computing machines and/or networked devices within the customer's internal network. In some embodiments, the internal network further includes a disconnected centralized server (e.g., disconnected centralized server 150 in FIG. 1). Because the disconnected centralized server is not connected to the external server, the disconnected centralized server cannot synchronize with the external server like the connected centralized server 200. Thus, in some embodiments, the exporter tool 250 of the connected centralized server 200 exports content from the connected centralized server 200 to the disconnected centralized server. The contents exported may be selected based on a set of predetermined criteria. Details of some embodiments of the process to export content have been discussed above.

In some embodiments, the user interface module 220 generates a user interface to allow an administrator to enter the criteria for selecting contents to export. The user interface may include graphical user interface, text user interface, command line user interface, etc. Some exemplary embodiments of user interface are discussed in details below.

In some embodiments, the export tool 250 is operable to package the selected content into a compressed data format, such as ISO images. Then the computer-readable medium accessing device 260 may burn the ISO images onto the portable computer-readable medium 265 removably coupled thereto, such as CD, DVD, a flash memory card with a USB connector, etc. Using the portable computer-readable medium 265, the content may be populated to the disconnected centralized server so that the disconnected centralized server may be synchronized with the external server without connecting to the external server.

Figure 2B:
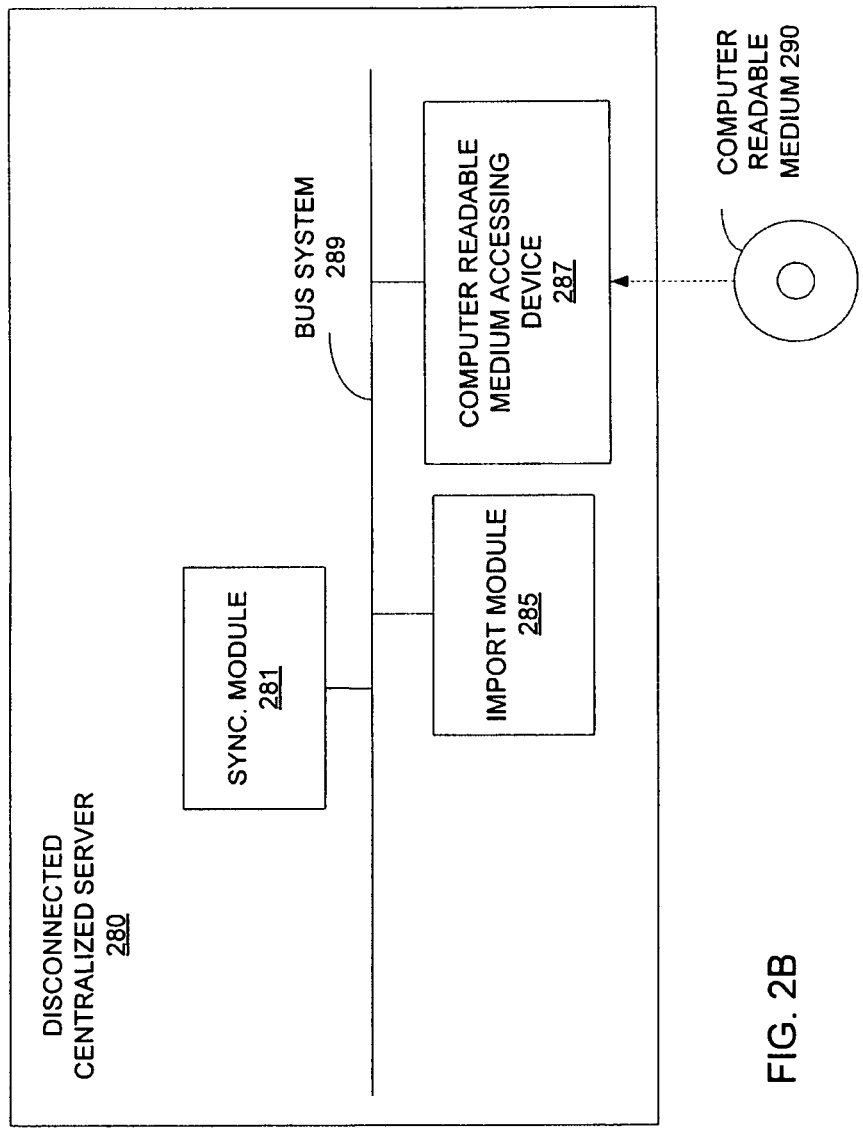
FIG. 2B illustrates a functional block diagram of one embodiment of a disconnected centralized server.

FIG. 2B illustrates a functional block diagram of one embodiment of a disconnected centralized server. The disconnected centralized server 280 may reside in an internal network of a customer of a software vendor, such as the disconnected centralized server 150 in FIG. 1. The disconnected centralized server 280 includes a synchronization module 281, an internal network interface 283, an import module 285, and a computer-readable medium accessing device 287, which are coupled to each other via a bus system 289. The computer-readable medium accessing device 287 may be removably coupled to a portable computer-readable medium 290 (e.g., CDs, DVDs, etc.).

From time to time, the import module 285 imports updated contents stored on the portable computer-readable medium 290 using the computer readable medium accessing device 287 in some embodiments. In some embodiments, the updated contents are burnt in a compressed data format, such as ISO images, on the portable computer-readable medium 290. Using the updated contents the import module 285 may synchronize the disconnected centralized server 280 with a connected centralized server and an external server. Details of some embodiments of the process to import contents to a disconnected centralized server have been discussed above.

FIG. 3A illustrates one embodiment of a method to synchronize a disconnected centralized server using a connected centralized server. The method may be performed by processing logic that may comprise hardware (e.g., circuitry, dedicated logic, programmable logic, microcode, etc.), software (such as instructions run on a processing device), firmware, or a combination thereof. For example, the synchronization module 210 of the connected centralized server 200 shown in FIG. 2A may perform at least part of the method.

Initially, processing logic synchronizes a connected centralized server with an external server of a software vendor (processing block 310). In some embodiments, processing logic retrieves updated contents from the external server and replaces the corresponding contents on the connected centralized server with the updated contents. Then processing logic exports contents from the connected centralized server to a disconnected centralized server to synchronize the disconnected centralized server with the external server (processing block 315). Processing logic may select contents to export based on a set of predetermined criteria. One embodiment of a process to export contents is described below in details.

FIG. 3B illustrates one embodiment of a method to export content. The method may be performed by processing logic that may comprise hardware (e.g., circuitry, dedicated logic, programmable logic, microcode, etc.), software (such as instructions run on a processing device), firmware, or a combination thereof. For example, the export tool 250 of the connected centralized server 200 shown in FIG. 2A may perform at least part of the method.

Processing logic generates a user interface to receive a set of export criteria from a user (such as an administrator) (processing block 320). The user interface may include graphical user interface, text user interface, command line interface, etc. Then processing logic selects contents based on the set of criteria received (processing block 322). For example, the criteria may include a range of dates, specific content type(s), etc. Then processing logic may package the contents selected into a compressed data format, such as ISO images, a directory structure, etc. (processing block 324). Next, processing logic determines if the user has selected to export the contents to portable computer-readable media or shared storage devices within a customer's internal network (processing block 325).

If the user has selected to export the contents to portable computer-readable media, then processing logic burns the contents packaged onto one or more portable computer-readable media, such as CD, DVD, etc., in some embodiments (processing block 326). Then the content may be populated to a disconnected centralized server using the portable computer-readable media (processing block 327).

Otherwise, if the user has selected to export the contents to shared storage devices, then processing logic may export the content as multiple files to a directory structure on the shared storage devices (processing block 328). The directory structure may include a directory tree. The directory structure may be under a location the user previously indicated. Some examples of the shared storage devices include shared storage devices in a Storage Area Network (SAN) adopting Internet Small Computer System Interface (iSCSI) protocol, shared storage devices in a Network Attached Storage (NAS) system adopting Network File System (NFS) protocol, Common Internet File System (CIFS) protocol, Server Message Block (SMB) file sharing protocol (or implementations thereof, e.g., SAMBA), etc. Finally, processing logic may populate the contents to a disconnected centralized server via the shared storage devices (processing block 329).

Figure 3C:
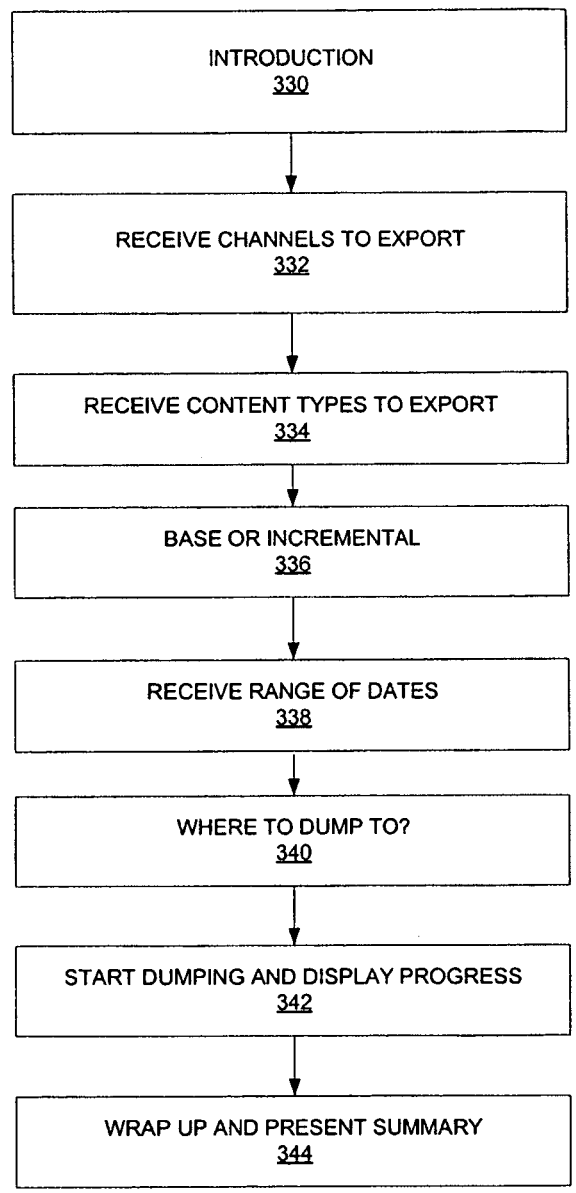
FIG. 3C illustrates one embodiment of a method to interact with users for exporting content.

FIG. 3C illustrates one embodiment of a method to interact with users for exporting content from a connected centralized server to a disconnected centralized server. The method may be performed by processing logic that may comprise hardware (e.g., circuitry, dedicated logic, programmable logic, microcode, etc.), software (such as instructions run on a processing device), firmware, or a combination thereof. For example, the user interface module 220 of the connected centralized server 200 shown in FIG. 2A may perform at least part of the method.

Initially, processing logic presents an introduction to users via a user interface (processing block 330). Then processing logic receives user selection of one or more channels to export to the disconnected centralized server (processing block 332). Furthermore, processing logic receives user selection of one or more channels to export to the disconnected centralized server (processing block 334). Then processing logic receives user selection of either base or incremental export (processing block 336). Processing logic may further receive user input of a range of dates (processing block 338). Moreover, processing logic further receives user input of where the updated content should be dumped to (processing block 340). For instance, the users may specify a particular directory in which the updated contents should be dumped to. Based on the user input, processing logic may export the selected types of contents in the selected channels, which has been updated during the selected range of dates, to the disconnected centralized server as follows.

In some embodiments, processing logic starts dumping the selected updated contents to the particular directory specified, and displays the progress of the dumping on a user interface (processing block 342). Finally, processing logic wraps up the dumping and presents a summary of the dumping (processing block 344). Some exemplary embodiments of user interface are described below.

Figure 4A:
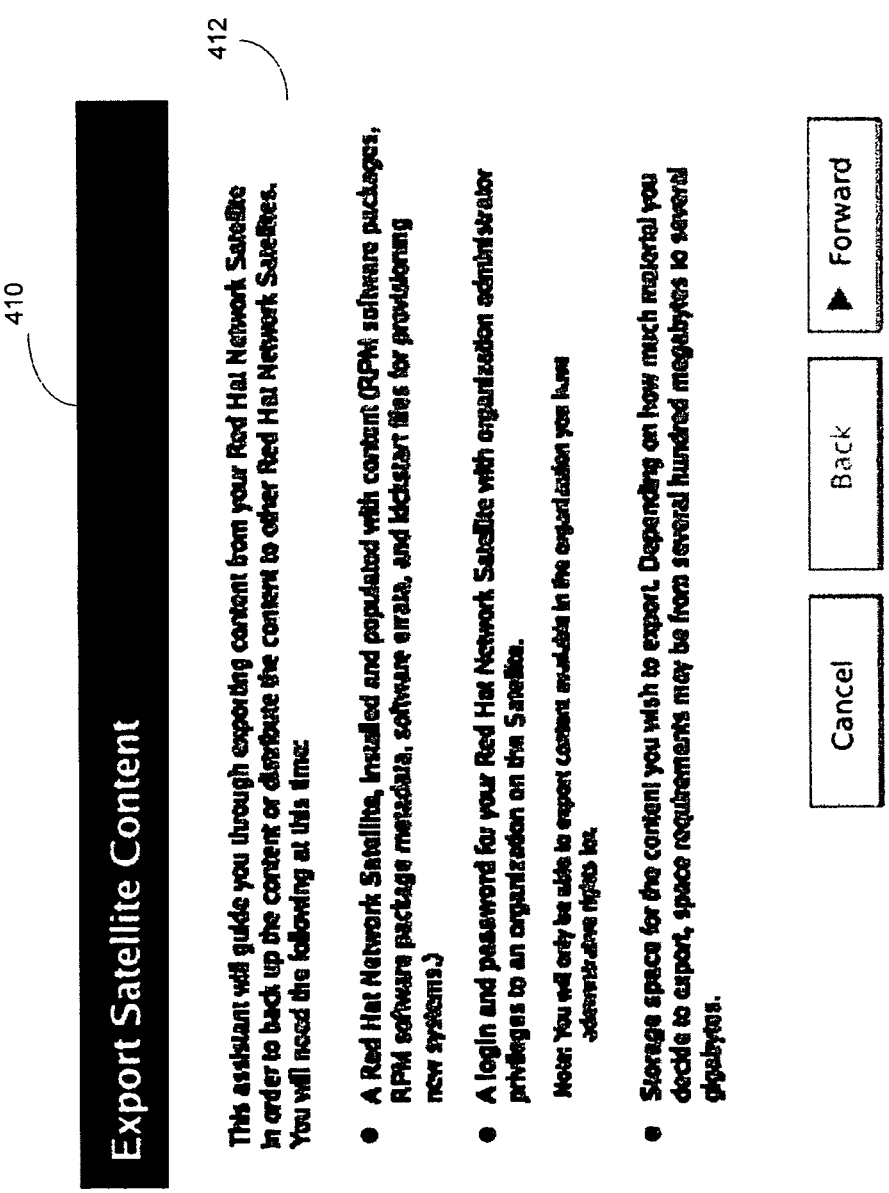

FIGS. 4A-4H illustrate one embodiment of a series of graphical user interfaces (GUIs) to allow users to export content from a connected centralized server. In FIG. 4A, the GUI 410 presents an introduction 412 of the process to export content from a connected centralized server. In FIG. 4B, the GUI 420 shows two lists of software channels in a particular organization on a connected centralized server, a list of parent software channels 422 and a list of child software channels 424. Users may select the particular channel(s) from the lists 422 and 424 to export.

FIG. 4C illustrates a GUI 430 to allow users to select content types to export. A list of available content types 432 is shown in the GUI 430, where the users may select content types to export. FIG. 4D illustrates a GUI 440 to allow users to select a base type of content export 442 or an incremental type of content export 444. In some embodiments, the base type of content export may result in the inclusion of all available content of the selected content types in the selected channels, where as the incremental type of content export may include only content that has been added to the channel between a set of specified dates. The GUI 440 provides drop-down lists 446 and text fields 448 for users to enter the set of dates.

Figure 4E:
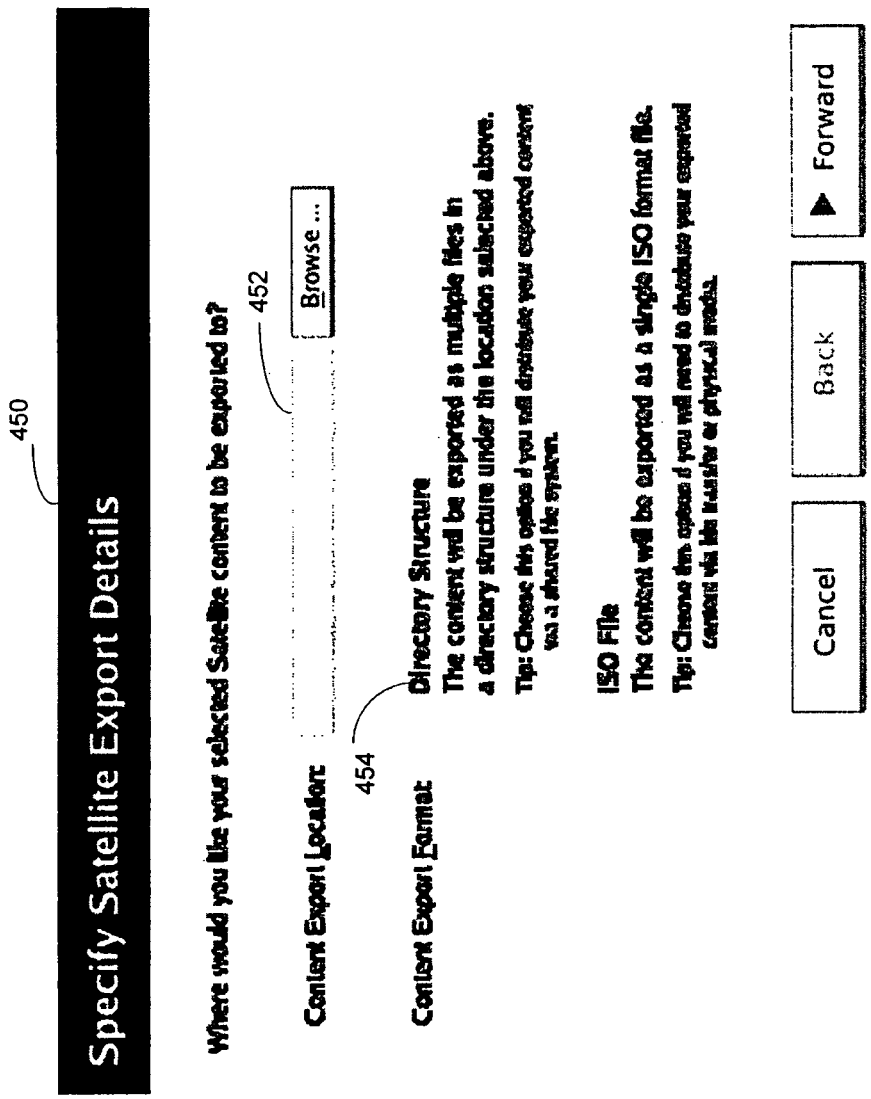

FIG. 4E illustrates a GUI 450 to allow users to enter further details of the content export. The GUI 450 includes a text field 452 for the users to enter a location at which the content may be exported to. For instance, the users may enter a path of a directory in which the content is to be exported to. The GUI 450 further includes a list of content export formats 454. The users may select one of the content export formats, such as directory structure and ISO file. If directory structure is selected, the content may be exported as multiple files in a directory structure under the location entered in text field 452. Users may select directory structure if the exported content will be distributed via a shared file system (such as NAS, SAN, etc.). If ISO file is selected, the content may be exported as a single ISO format file. In some embodiments, users may select ISO file if the exported content will be distributed via a portable computer-readable medium.

Figure 4F:
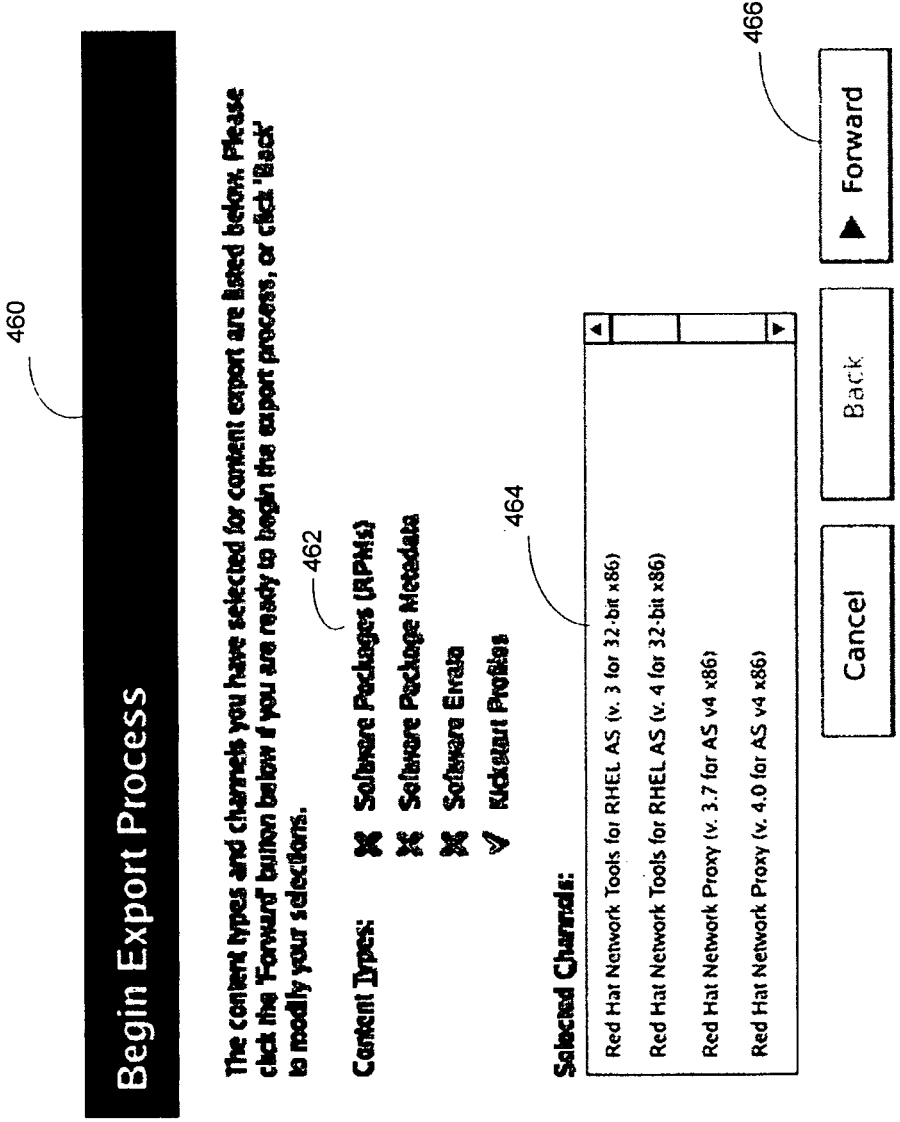

FIG. 4F illustrates a GUI 460 to allow users to initiate the content export process. The GUI 460 displays a list of content types selected 462 and a list of channels selected 464 so that the users may double-check their selection before initiating the content export process. When the users are ready, the users may actuate the forward button 466 in the GUI 460 to initiate the content export process.

Figure 4G:
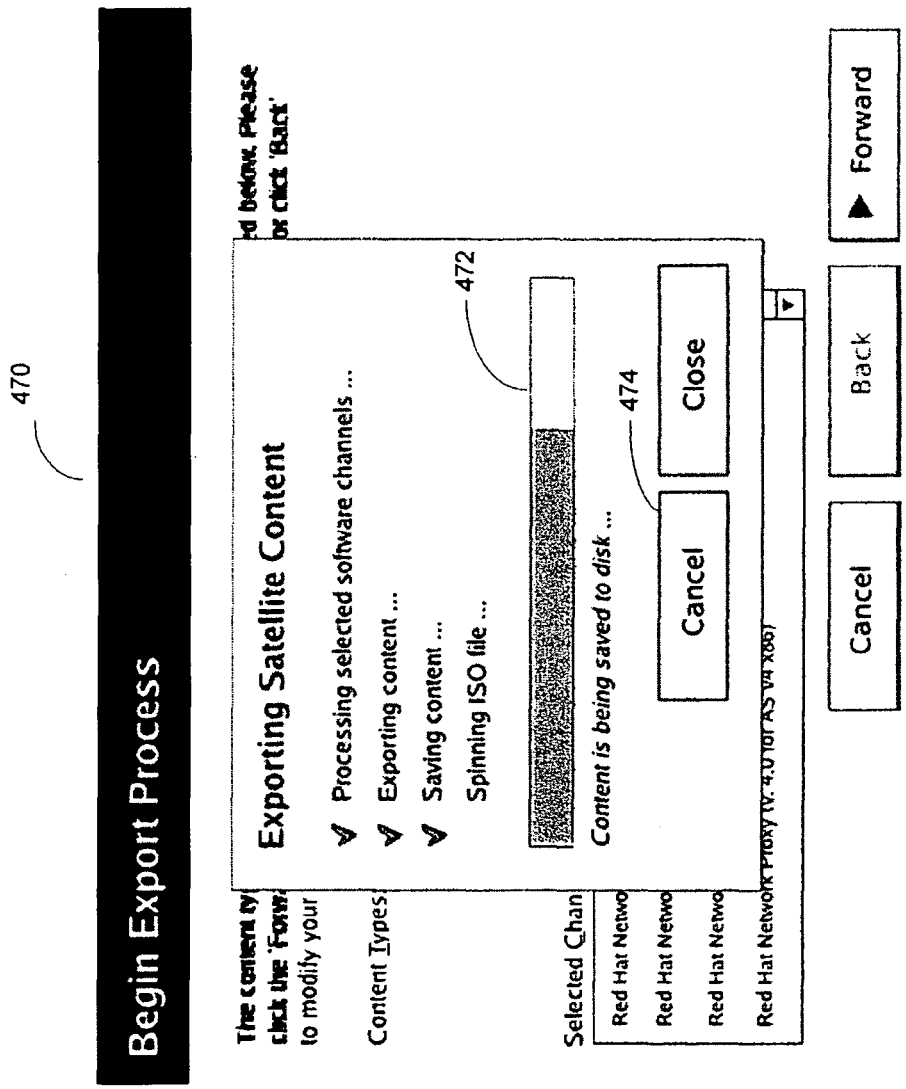

FIG. 4G illustrates a GUI 470 to show the progress of the content export process. The GUI 470 includes a status bar 472 to indicate how far along the content export process it is. The GUI 470 further includes user interface control, a cancel button 474, to allow users to cancel the content export process while the content export process is going on.

Figure 4H:
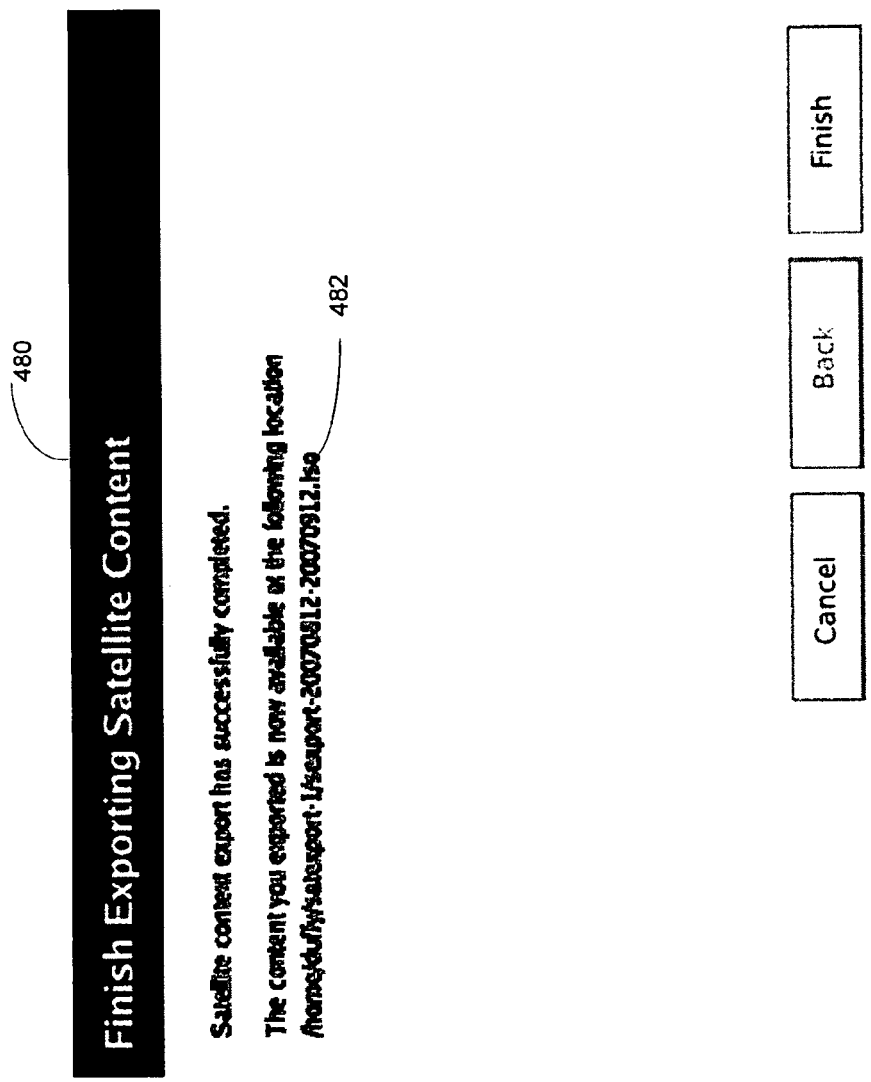

FIG. 4H illustrates a GUI 480 to report to users that the content export process has been completed successfully. The GUI 480 shows the location 482 at which the exported content is available. In addition to, or in alternative to, graphical user interface, other types of user interface may be generated to allow users to enter export criteria, such as text user interface, command line interface, etc. Some embodiments of a series of text user interface are discussed in details below.

Figure 5A:
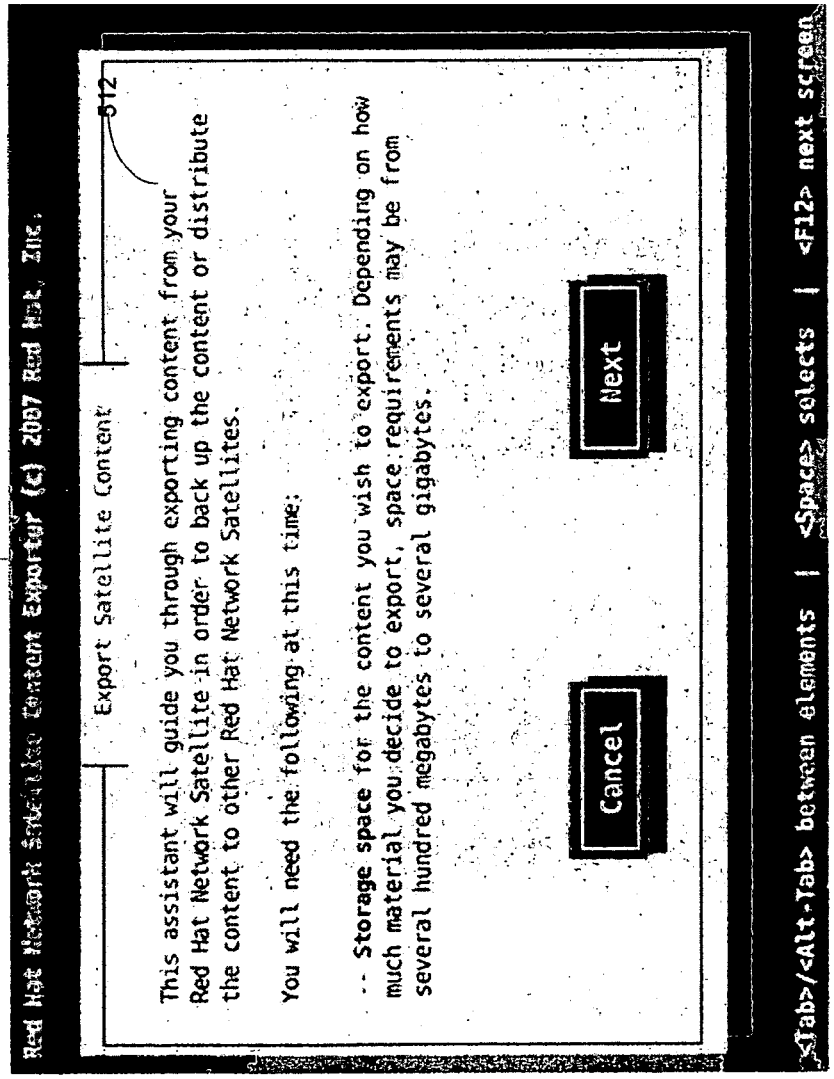
FIGS. 5A-5D illustrate some embodiments of a series of text user interfaces.
Figure 5B:
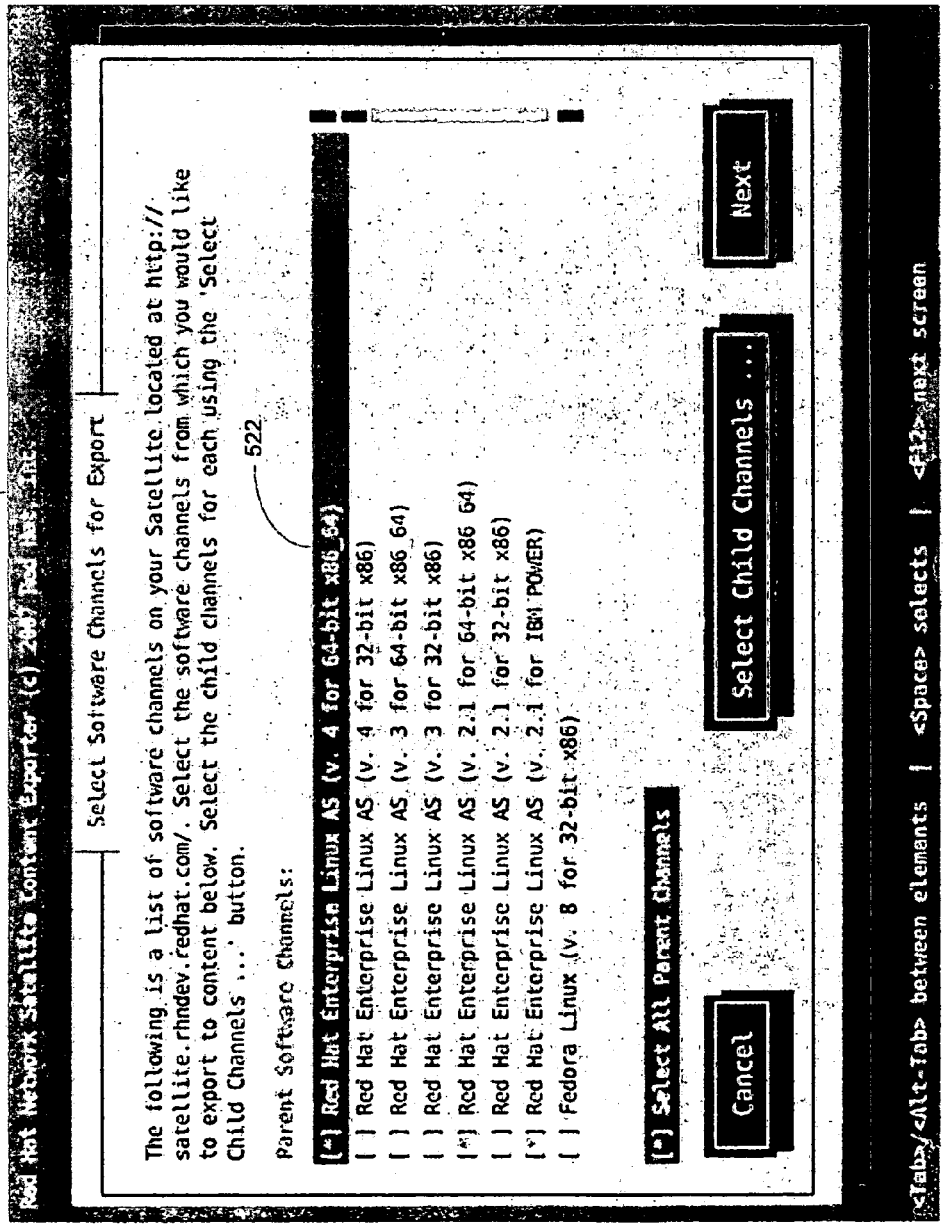
Figure 5C:
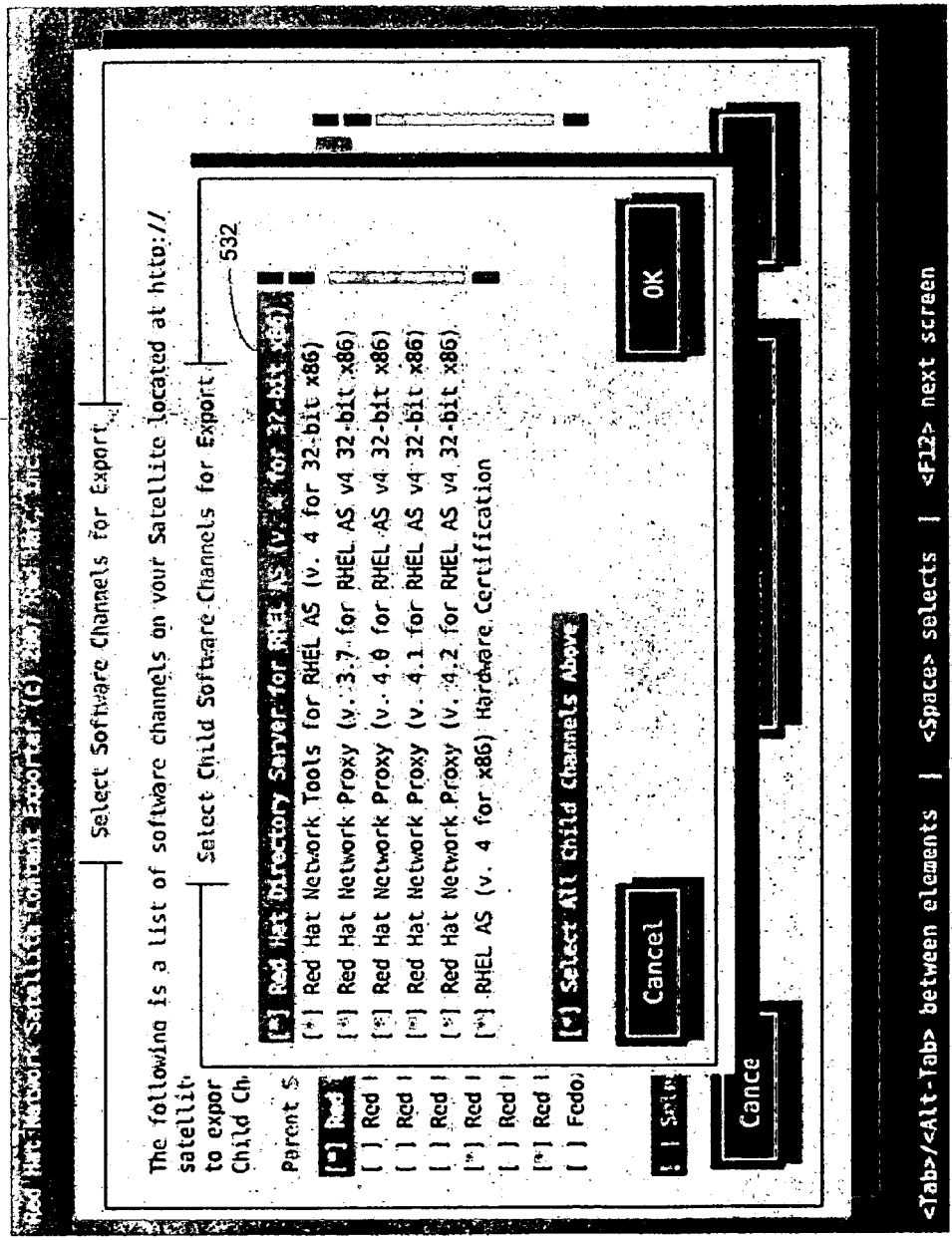
Figure 5D:
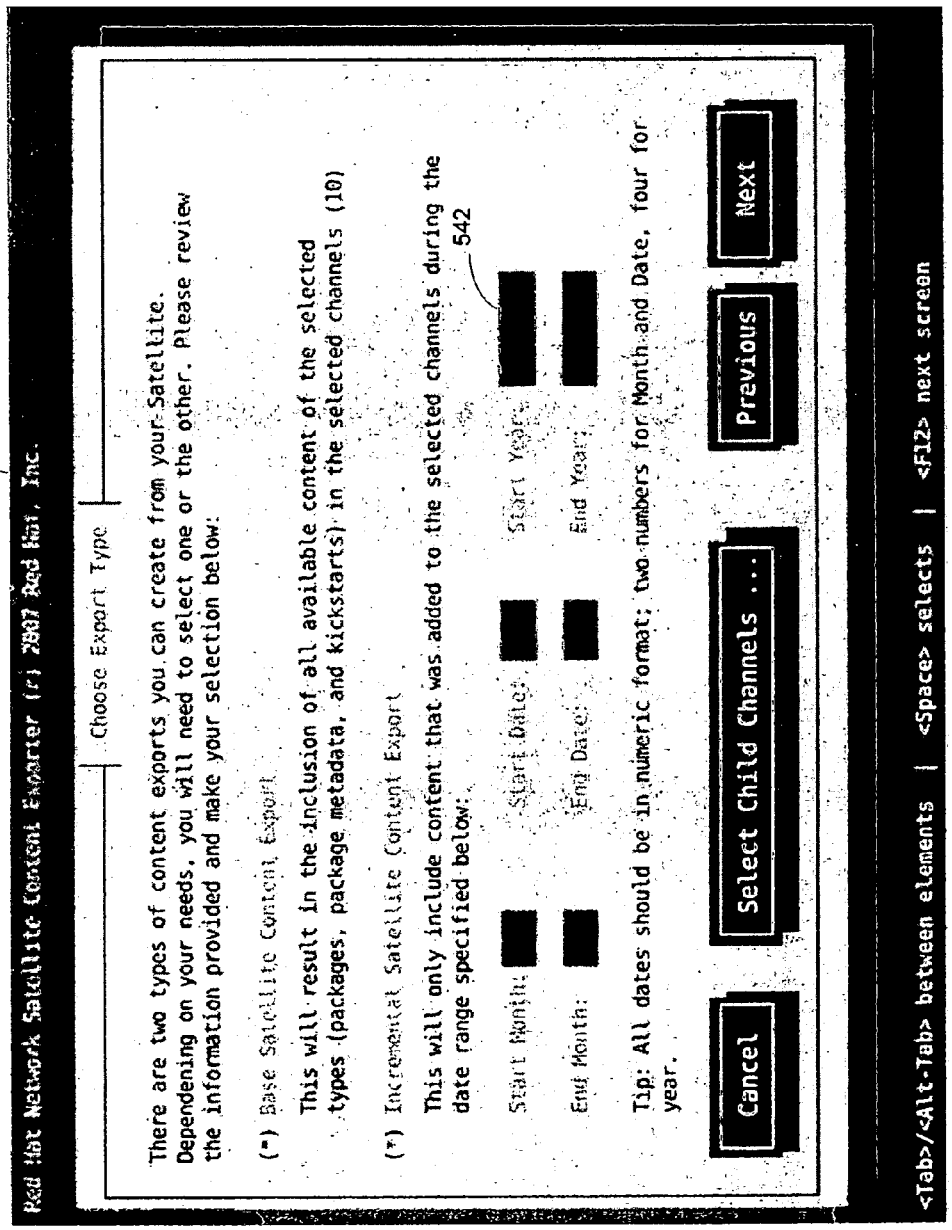

FIGS. 5A-5D illustrate some embodiments of a series of text user interfaces. In FIG. 5A, the GUI 510 provides a brief introduction 512 to users on the content export process. FIG. 5B illustrates a GUI 520 to display a list 522 of parent software channels on a connected centralized server. Users may select one or more parent software channels from the list 522 to export. FIG. 5C illustrates a GUI 530 to display a list 532 of child software channels of the parent software channels selected in the previous GUI 520. Users may select one or more child software channels from the list 532 to export. FIG. 5D illustrates a GUI 540 to allow users to select either a base type content export or an incremental type content export. In some embodiments, the base type of content export may result in the inclusion of all available content of the selected content types in the selected channels, where as the incremental type of content export may include only content that has been added to the channel between a set of specified dates. The GUI 540 provides text fields 542 for users to enter the set of dates.

Note that the series of GUIs shown in FIGS. 4A-4H and 5A-5D are merely examples meant to illustrate the concept, not to limit the present invention. GUIs having different presentation and/or user interface control may be used in other embodiments.

Figure 6:
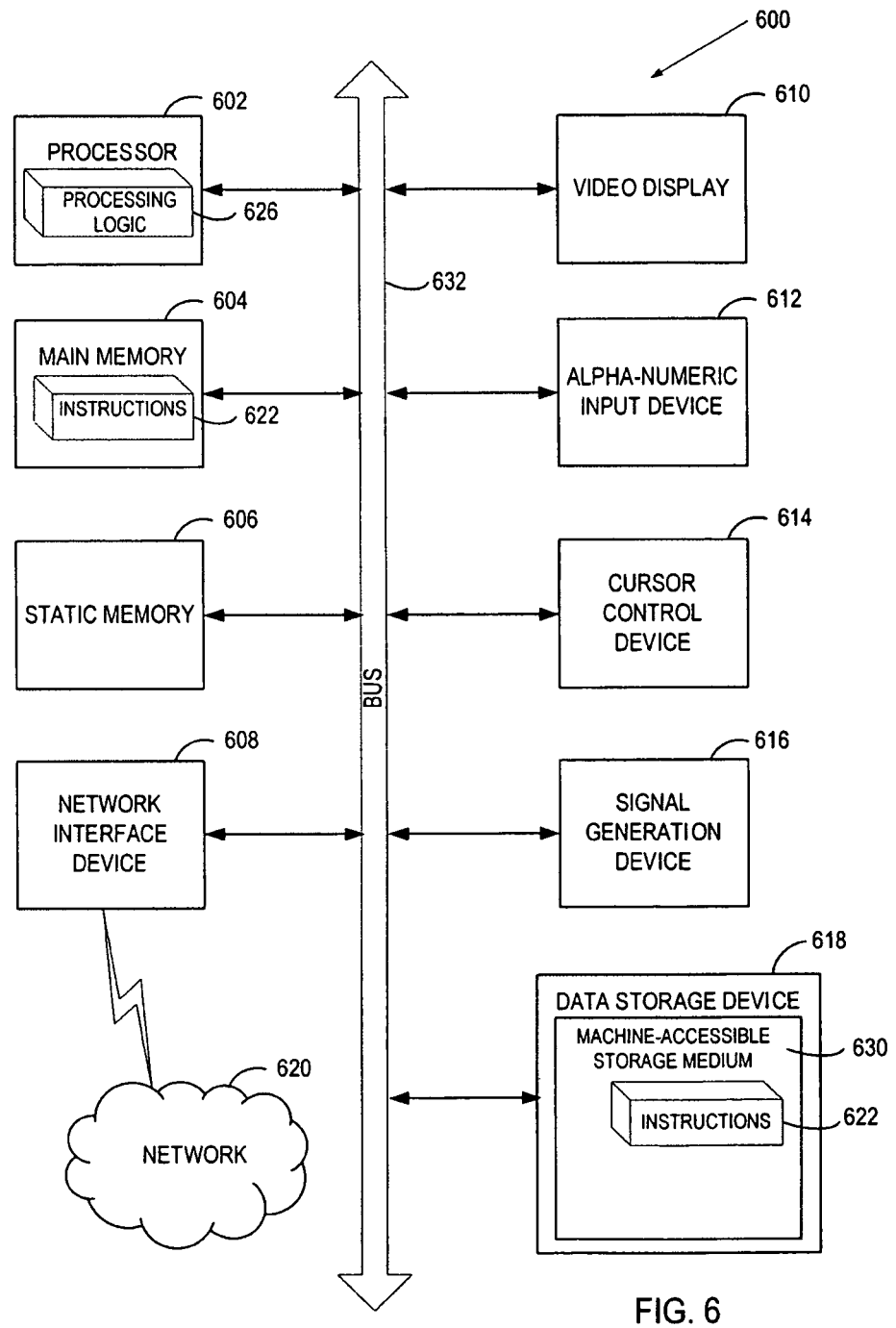
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of an enhanced exporter tool have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of a first server residing in an internal network, a selection of one or more software data files over an external network, wherein the one or more software data files are to be synchronized to the first server and are selected in view of an export format of the one or more software data files;
synchronizing the one or more software data files between the first server and an external server of the external network;
receiving, via a graphical user interface, a selection of contents from the one or more software data files from the first server to be exported into a directory structure in view of a plurality of criteria comprising one or more content types, wherein the one or more content types comprise a package metadata, a RPM Package Manager (RPM), an errata, and a kickstart profile; and
exporting, by the processing device, the selection of the contents from the first server to a second server residing in the internal network, wherein the second server resides in a secured portion of the internal network and the second server is not permitted to connect to the external network.

2. The method of claim 1, wherein exporting the selection of the contents from the first server comprises storing the selection of the contents into the directory structure on one or more shared storage devices accessible by the second server.

3. The method of claim 1, wherein the selection of the contents is selected from the one or more software data files from the first server in view of a set of criteria comprising a range of dates.

4. The method of claim 1, further comprising generating at least one of the graphical user interface, a command line interface, or a text interface to allow users to enter a set of criteria in view of which the contents are selected.

5. The method of claim 1, wherein receiving the selection of one or more software data files comprises receiving a selection of one or more subscribed channels, each of the subscribed channels comprising a collection of software packages organized into a logical grouping, wherein synchronizing the one or more software data files comprising synchronizing the selection of the one or more subscribed channels between the first server and the external server, and wherein exporting comprises exporting the selection of the one or more subscribed channels from the first server to the second server.

6. The method of claim 1, wherein the one or more software data files comprises at least one of channels, packages, errata, provisioning information, package managers, activation keys, user definitions, system groups, system configuration data, system software profiles, installable software media, virtual machine images, or system metadata.

7. The method of claim 6, wherein the one or more software data files are of a predetermined format.

8. The method of claim 7, wherein the predetermined format is a compressed extended markup language (XML).

9. The method of claim 1, wherein the selection of the contents is selected from the one or more software data files in view of a set of criteria comprising at least one of a location at which the content is exported, a user selection of a base type content export, or a user selection of an incremental type content export.

10. A server comprising:
a memory; and
a processing device, communicatively coupled to the memory, to:
receive a selection of one or more software data files over an external network, wherein the one or more software data files are to be synchronized to the server residing in an internal network and are selected in view of an export format of the one or more software data files,
synchronize the one or more software data files between the server and an external server of the external network
receive, via a graphical user interface, a selection of contents from the one or more software data files from the server to be exported into a directory structure in view of a plurality of criteria comprising one or more content types, wherein the one or more content types comprise a package metadata, a RPM Package Manager (RPM), an errata, and a kickstart profile; and
export the selection of the contents from the server to a second server residing in the internal network, wherein the second server resides in a secured portion of the internal network and the second server is not permitted to connect to the external network.

11. The server of claim 10, further comprising an external network interface coupled to the processing device to establish a secure connection with the external server over a public network.

12. The server of claim 10, wherein the selection of the contents is selected from the one or more software data files from the server in view of a set of criteria comprising a range of dates.

13. The server of claim 10, wherein the processing device is further to generate at least one of the graphical user interface, a command line interface, or a text user interface to receive a set of criteria in view of which the contents are selected.

14. The server of claim 10, wherein to receive the selection of one or more software data files, the processing device is to receive a selection of one or more subscribed channels, each of the subscribed channels comprising a collection of software packages organized into a logical grouping, and wherein to synchronize the one or more software data files, the processing device is to synchronize the selection of the one or more subscribed channels between the server and the external server, and wherein to export, the processing device is to export the selection of the one or more subscribed channels to the second server.

15. The server of claim 10, wherein the one or more software data files comprises at least one of channels, packages, errata, provisioning information, package managers, activation keys, user definitions, system groups, system configuration data, system software profiles, installable software media, virtual machine images, or system metadata.

16. The server of claim 10, wherein the selection of the contents is selected from the one or more software data files in view of a set of criteria comprising at least one of a location at which the content is exported, a user selection of a base type content export, or a user selection of an incremental type content export.

17. A non-transitory computer-readable medium storing instructions that, when executed by a processing device of a first server, causes the processing device to:
receive, by the processing device of the first server residing in an internal network, a selection of one or more software data files over an external network, wherein the one or more software data files are to be synchronized to the first server and are selected in view of an export format of the one or more software data files;
synchronize the one or more software data files between the first server and an external server of the external network;
receive, via a graphical user interface, a selection of contents from the one or more software data files from the first server to be exported into a directory structure in view of a plurality of criteria comprising one or more content types, wherein the one or more content types comprise a package metadata, a RPM Package Manager (RPM), an errata, and a kickstart profile; and
export, by the processing device, the selection of the contents from the first server to a second server residing in the internal network, wherein the second server resides in a secured portion of the internal network and the second server is not permitted to connect to the external network.

18. The computer-readable medium of claim 17, wherein to export the selection of the contents from the first server, the processing device is further to store the selection of the contents into the directory structure on one or more shared storage devices accessible by the second server.

19. The computer-readable medium of claim 17, wherein the selection of the contents is selected from the one or more software data files from the first server in view of a set of criteria comprising a range of dates.

20. The computer-readable medium of claim 17, wherein the processing device is further to generate at least one of the graphical user interface, a command line interface, or a text interface to allow users to enter a set of criteria in view of which the contents are selected.

21. The computer-readable medium of claim 17, wherein the selection of the contents is selected from the one or more software data files in view of a set of criteria comprising at least one of a location at which the content is exported, a user selection of a base type content export, or a user selection of an incremental type content export.

22. A system comprising:
a first server residing in an internal network, comprising:
a first memory; and
a first processing device communicatively coupled to the first memory, wherein the first processing device is to:
receive a selection of one or more software data files over an external network, wherein the one or more software data files are to be synchronized to the first server and are selected in view of an export format of the one or more software data files;
synchronize the one or more software data files between the first server and an external server of the external network;
receive, via a graphical user interface, a selection of contents from the one or more software data files from the first server to be exported into a directory structure in view of a plurality of criteria comprising one or more content types, wherein the one or more content types comprise a package metadata, a RPM Package Manager (RPM), an errata, and a kickstart profile; and
export the selection of the contents from the first server to a second server residing in a secured portion of the internal network, the second server comprising:
a second memory; and
a second processing device communicatively coupled to the second memory, wherein the second processing device is to import the selection of the contents from the first server, and wherein the second server is not permitted to connect to the external network.

23. The system of claim 22, further comprising a set of one or more shared storage devices accessible by the second server, wherein the processing device is to store the selected contents in the directory structure on the set of one or more shared storage devices.

24. The system of claim 22, wherein the selection of the contents is selected from the one or more software data files in view of a set of criteria comprising at least one of a location at which the content is exported, a user selection of a base type content export, or a user selection of an incremental type content export.

* * * * *